F. TRULENDER.
HORSE-POWER.
No. 171,450. Patented Dec. 21, 1875.
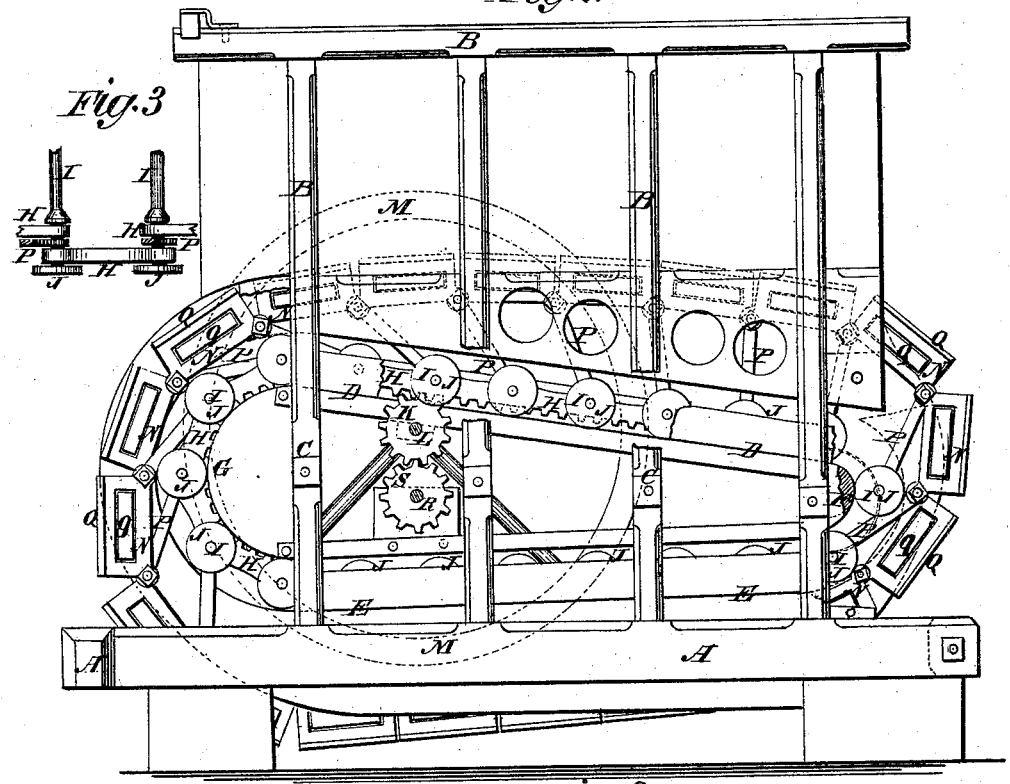
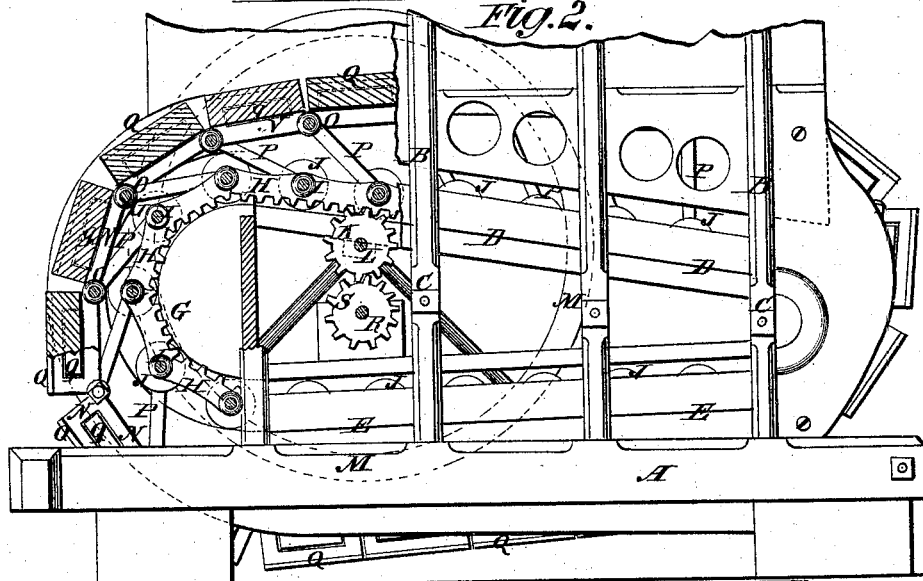
WITNESSES: F. McArdle, A. F. Roberts
INVENTOR: F. Trulender
BY [signature]
ATTORNEYS.

UNITED STATES PATENT OFFICE.

FREDERICK TRULENDER, OF HARMERSVILLE, NEW JERSEY.

IMPROVEMENT IN HORSE-POWERS.

Specification forming part of Letters Patent No. 171,450, dated December 21, 1875; application filed November 27, 1875.

*To all whom it may concern:*

Be it known that I, FREDERICK TRULENDER, of Harmersville, in the county of Salem and State of New Jersey, have invented a new and useful Improvement in Horse-Power, of which the following is a specification:

Figure 1 is a side view of my improved machine, parts of the casing being broken away to show the construction. Fig. 2 is a side view of the same, partly in section, to show the construction. Fig. 3 is a detail view of a portion of the inner endless chain. Fig. 4 is a detail view of a portion of the outer endless chain.

Similar letters of reference indicate corresponding parts.

The object of this invention is to furnish an improved horse-power, which shall be so constructed that the horse or horses can walk upon a level and produce the same effect as when walking upon an inclined plane.

The invention consists in the combination of the platform-planks, the slotted links, the two sets of cross-rods, the connecting-bars, the toothed links, and the wheels or rollers, with the inclined and curved tracks, and the gear-wheels attached to the driving-shaft, and in the combination of the second shaft and its gear-wheels with the shaft and gear-wheels connected with the toothed links, as hereinafter fully described.

A is the base-frame, and B are the side or upright frames. The side frames B are connected and held from spreading by cross or tie bolts C, which pass through the uprights of the said side frames B, and through the space within the inner endless chain. The frame-work A B is made about eight feet long and four feet wide when intended for two horses. To the side frames B are attached the upper tracks or ways D with a downward inclination toward the rear end of the machine of from sixteen to twenty inches. To the lower parts of the side frames B are attached the lower ways or tracks E with a downward inclination forward of about six inches. The ways D E are connected at the rear end of the machine by a short curved track, F, and at the forward end of the machine by a longer curved track, G. H are toothed links, the ends of which are pivoted to the ends of cross-rods I, to form the inner endless chain. To the ends of the cross-rods I are pivoted small wheels or rollers J, which roll along the tracks D E F G. The links H are about twelve and a half inches long, and their teeth mesh into the teeth of two gear-wheels, K, attached to the shaft L. To one end of the shaft L is attached a pulley or wheel, M, to receive the driving-belt. The pulley M is made large and heavy, to adapt it to act as a fly-wheel. N are the links of the upper endless chain, which are made about seventeen inches long, and their ends are pivoted to the ends of the cross-rods O. P are bars about sixteen inches long, the outer ends of which are pivoted to the cross-rods O of the outer endless chain N O, and their inner ends are pivoted to the cross-rods I of the inner endless chain H I. In the links N are formed slots to receive tenons $q'$ formed upon the inner parts of the ends of the planks Q, that form the platform upon which the horse or horses walk, the upper part of said ends projecting over the said links, to form a smooth platform. By this construction, as the wheels J pass from the curved track G to the upper end of the upper inclined track D, the bars P are nearly in a horizontal position, which bars, as the said wheels J move down the said upper track, gradually approach a vertical position, owing to the difference in length of the links N H, so that the platform Q will be kept in or nearly in a horizontal position.

This construction of the machine relieves the horse or horses from the tiresome labor of walking continuously up an inclined plane, so that they can work much longer, while the inclination of the track enables their weight to produce the same driving power as it would in a machine in which the platform and track are both inclined. R is a shaft placed parallel with the shaft L, and revolving in bearings attached to the frame B. To the shaft R are attached two gear-wheels, S, the teeth of which mesh into the teeth of the gear-wheels K. The shaft R is thus revolved in the opposite direction from the shaft L, so that the pulley or wheel M may be attached to the shaft R when left-hand machinery is to be driven to avoid the use of a crossed belt.

Having thus described my invention, I claim as new and desire to secure by Letters Patent—

1. The combination of the platform-planks Q, the slotted links N, the two sets of cross-rods O I, the connecting-bars P, the toothed links H, and the wheels or rollers J, with the inclined and curved tracks D E F G, and the gear-wheels K attached to the driving-shaft L, substantially as herein shown and described.

2. The combination of the second shaft R, and its gear-wheels S, with the shaft and gear-wheels L K, connected with the toothed links H, substantially as herein shown and described.

FREDERICK TRULENDER.

Witnesses:
W. H. LAWSON,
A. W. THERRON.